United States Patent [19]

Proffitt

[11] 4,232,059
[45] Nov. 4, 1980

[54] PROCESS OF DEFINING FILM PATTERNS ON MICROELECTRONIC SUBSTRATES BY AIR ABRADING

[75] Inventor: William G. Proffitt, St. Petersburgh, Fla.

[73] Assignee: E-Systems, Inc., Dallas, Tex.

[21] Appl. No.: 46,031

[22] Filed: Jun. 6, 1979

Related U.S. Application Data

[63] Continuation-in-part of Ser. No. 825,209, Aug. 17, 1977, abandoned.

[51] Int. Cl.³ .......................... B05D 5/12; B24B 1/04
[52] U.S. Cl. ..................................... 427/96; 51/310; 51/311; 51/312; 51/319; 156/645; 156/656; 427/108; 427/348; 427/349; 427/259; 427/272; 427/273; 427/282; 427/270; 427/355; 430/318
[58] Field of Search ............... 427/96, 348, 319, 259, 427/272, 273, 282, 270, 355, 367, 108; 51/310, 311, 312, 319; 156/645, 656; 430/318

[56] References Cited

U.S. PATENT DOCUMENTS

| | | | |
|---|---|---|---|
| 3,210,214 | 10/1965 | Smith | 427/99 |
| 3,240,624 | 3/1966 | Beck | 427/96 |
| 3,419,425 | 12/1968 | Conrad | 427/348 |
| 3,873,361 | 3/1975 | Franco et al. | 427/259 |
| 4,020,535 | 5/1977 | Cuneo et al. | 52/319 |
| 4,027,323 | 5/1977 | Lorenze et al. | 51/310 |
| 4,047,286 | 9/1977 | Lob et al. | 51/319 |

Primary Examiner—John D. Smith
Attorney, Agent, or Firm—Robert V. Wilder; Albert M. Crowder

[57] ABSTRACT

A process is disclosed for delineating a patterned electroconductive coating on a substantially nonconductive substrate. The process can be used on substrates having a thickness in excess of 50 microinches. The process involves forming a substantially continuous electroconductive film on a substrate. An air abrasive resistant continuous mask film of metallic material is applied to the electroconductive film and etched to form masked and unmasked portions of the electroconductive film corresponding to the desired patterned coating. The unmasked portions of the electroconductive film are removed to leave the masked portions of the electroconductive film remaining on the substrate. The mask film can then be removed from the electroconductive film resulting in the desired pattern delineated in the electroconductive film on the substrate or the mask can remain in place and be used to form an integral part of the device formed with the substrate.

5 Claims, 6 Drawing Figures

PROCESS OF DEFINING FILM PATTERNS ON MICROELECTRONIC SUBSTRATES BY AIR ABRADING

RELATED APPLICATION

This application is a continuation-in-part of copending Application for United States Letters Pat. Ser. No. 825,209, filed Aug. 17, 1977 now abandoned.

FIELD OF THE INVENTION

This invention relates to a process for forming electroconductive patterns on substantially nonconductive substrates, and more particularly to a process for delineating patterns having improved width and spacing tolerances.

THE PRIOR ART

In applications where electroconductive coatings are applied to nonconductive substrate materials such as glass, ceramics, plastics and the like, it is difficult to apply patterned coatings directly to the substrate. Therefore, continuous coatings are applied and are thereafter patterned. Prior processes for delineating a pattern in a continuous coating have included placing a separately formed unattached mask over the continuous coating such that the mask has the desired pattern. The electroconductive coating is then sandblasted around the mask. Because the mask is merely held in place, some undercutting of the coating takes place causing the resulting pattern to have uneven edges, resulting in undesirable electrical properties of the coating and relatively poor resolution. In addition, if it is desired to form patterns in film coatings that are greater than 50 microinches in thickness, conventional masking methods can be altogether unsatisfactory. In some applications, such as the fabrication of microelectronic color bar printheads, it is desirable for the delineated pattern to have a relatively high current carrying capability. By increasing the thickness of the electroconductive coating, the current carrying capability of the electroconductive pattern formed from the coating is also increased. Thus, a need has arisen for a method of precisely and accurately delineating patterns on microelectronic substrates having electroconductive coatings with thicknesses in excess of 50 microinches.

Other previous methods of delineating a patterned electroconductive coating include etching, electric burning and the like. However, these methods have been found to be unsatisfactory where the patterns are small, the substrate surface uneven and where the pattern line width or the spacing between the lines is small and requires a high degree of definition.

Prior methods of delineating a patterned electroconductive coating have also included bonding of the mask to a nonconductive substrate. A prior bonding method is described and claimed in U.S. Pat. No. 3,240,624 by Ronald A. Beck entitled "Method of Forming a Pattern Electroconductive Coating" and issued Mar. 15, 1966. Such a method has required the application of a synthetic resin catalyst to be applied to the substrate film coating before the mask is applied. The mask, where a catalyst is used, is required to be of an uncured and uncatalyzed synthetic resinous material adapted to be cured by the catalyst. The application of such a mask material tends to yield masks that have poor line width and tolerances. Furthermore masks that are composed of synthetic resinous materials cannot be utilized as an integral part of the electroconductive pattern to include fabricated circuit elements.

A need has thus arisen for a process for forming electroconductive patterns having improved line width and spacing resolution, that is easily and economically feasible to manufacture. Moreover, a need has arisen for a process for delineating a patterned electroconductive coating in which circuit elements are fabricated within the mask that is used to fabricate the pattern. Further, a need has arisen for a method of delineating electroconductive film patterns having high resolution in electroconductive films having thicknesses greater than 50 microinches, so that electroconductive film patterns can withstand higher current densities.

SUMMARY OF THE INVENTION

The present invention provides an improved process of delineating patterned electroconductive coating on a nonconductive substrate. This process provides for an economical and simplified method for fabricating patterned electroconductive coatings, especially when the thickness of the electroconductive coating is in excess of 50 microinches.

In accordance with the present invention, a process for delineating a patterned electroconductive coating on a substantially nonconductive substrate includes forming a substantially continuous film of an electroconductive material on a substrate. A mask film of metallic material that is air-abrasive resistant relative to the electroconductive film coating is integrally applied to the electroconductive film coating and etched to form masked and unmasked portions of the electroconductive film coating corresponding to the desired pattern coating. The unmasked portions of the electroconductive film coating are removed, preferably by air abrading, to thereby leave the masked portion of said electroconductive film coating remaining on the substrate. The mask is then removed from the electroconductive film coating, resulting in the desired pattern delineated in the electroconductive film coating on the substrate.

In accordance with another aspect of the present invention, a process for delineating a pattern in an antimony doped tin oxide film coating on a substantially nonconductive substrate includes the step of integrally applying to the tin oxide film coating a mask film coating of metallic material which is air abrasive resistant. The mask film is etched to form masked and unmasked portions on the tin oxide film coating corresponding to the desired pattern. The unmasked portions of the tin oxide film coating are air abraded to thereby leave the masked portions of the tin oxide film coating remaining on the substrate. The mask film is then removed from the tin oxide film coating resulting in the desired pattern delineated in the tin oxide film coating on the substrate.

In still another aspect of the invention, after formation of the pattern as previously described, instead of complete removal of the mask film, the mask film can be selectively etched to form discrete components as part of the mask.

DESCRIPTION OF THE DRAWINGS

For a more complete understanding of the present invention and advantages thereof, reference is now made to the following description taken in conjunction with the accompanying drawings, in which.

DESCRIPTION OF THE PRERERRED EMBODIMENT

Figure 1:
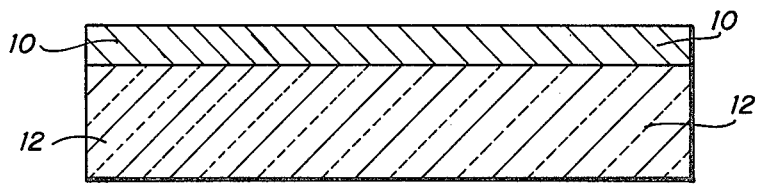
FIG. 1 is a cross-sectional view of a substrate illustrating a first step in the formation of a delineated pattern on the substrate in accordance with the process of the present invention.

Referring to FIG. 1, the first step in the process of the present invention is the application of a substantially continuous film coating 10 of an electroconductive material to a nonconductive substrate 12. Suitable substrate materials are glass, ceramics, alumina and the like. The electroconductive material forming film coating 10 may comprise, for example, antimony doped tin oxide and is applied to substrate 12 in the conventional manner. It is to be understood that film coating 10 may comprise other electroconductive materials and reference to antimony doped tin oxide as film coating 10 is used only for example. Any suitable electroconductive coating known to those skilled in the art may be used to form film coating 10. For example, nichrome-tin oxide, tantalum oxide or arsenic doped tin oxide may also be used for film coating 10.

Figure 2:
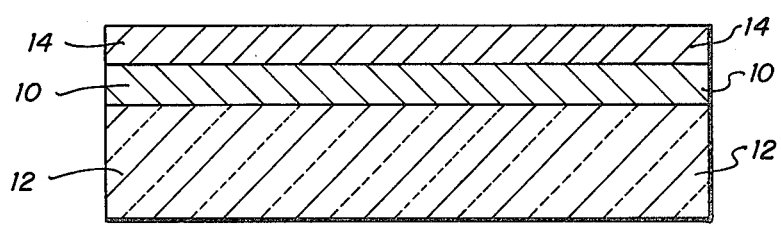
FIG. 2 is a cross-sectional view of a substrate illustrating a second step of the present process.

Referring to FIG. 2, the second step in the process of the present invention is the application to film coating 10 of a mask film 14 of metallic material having the characteristics of being air abrasive resistant relative to film coating 10. An important aspect of the present process is that mask film 14 is in intimate contact with film coating 10 of substrate 12. The intimate contact of mask film 14 with film coating 10 reduces any undercutting which could occur when unmasked portions of film coating 10 are air abraded, as will be hereinafter discussed, thereby providing improved pattern delineation. Mask film 14 may be applied to electroconductive film coating 10 either by selectively electroplating mask film 14 onto film coating 10 or by using standard vacuum deposit techniques to apply mask film 14 directly to film coating 10.

Figure 3:
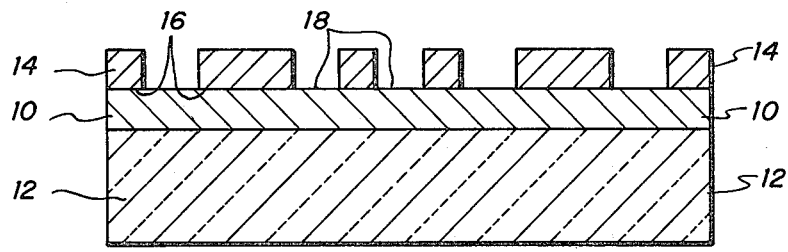
FIG. 3 is a cross-sectional view of a substrate illustrating a third step of the present process.

As illustrated in FIG. 3, the next step in the process of the present invention is to selectively chemically etch mask film 14. This step results in the formation of masked portions such as at 16 and unmasked portions such as at 18 of film coating 10, corresponding to the desired pattern. The etching of mask film 14 can be performed using standard photolithographic techniques.

Mask film 14 is comprised of a metallic material and may be formed from such material as copper, nickel, gold or combinations thereof. The process used to generate a typical copper mask consists of vacuum depositing a thin film of gold (not shown) onto film coating 10. The film of gold is then selectively plated up to approximately 300 microinches with copper using a photoresist as a mask. The thin film of gold, approximately 1000 angstroms in thickness, lies between film coating 10 and mask film 14. Those areas of the gold layer not plated with copper are etched away leaving unmasked areas 18.

Figure 4:
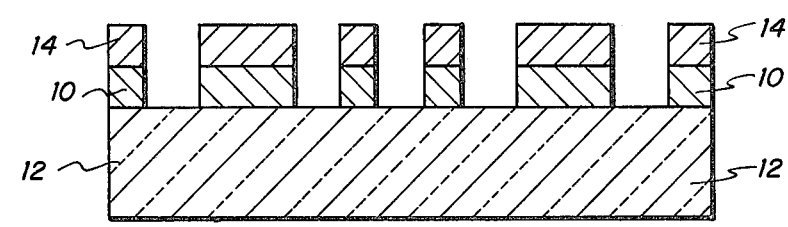
FIG. 4 is a cross-sectional view of a substrate illustrating a fourth step of the present process.

Referring to FIG. 4, the fourth step in the process is the removal of the unmasked portions 18 of film coating 10 using an air abrading technique. The air abrading process can be performed by standard sandblasting methods using a stream of suitably sized particles. For example, particles having a particle size from about 10 microns to about 25 microns can be used to remove unmasked portions 18 of film coating 10 to thereby uncover the surface of substrate 12. Preferably, air pressure is used to propel the particles and is maintained at about 50 psi (gauge). The spray head of the sandblasting apparatus should not be closer than ¾" to substrate 12.

Figure 5:
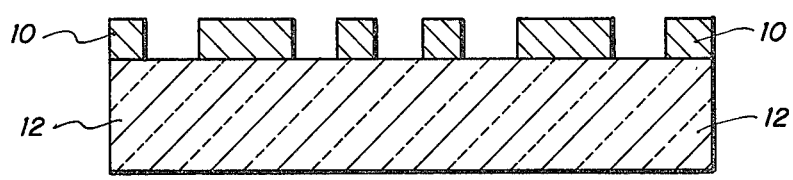
FIG. 5 is a cross-sectional view of a substrate illustrating a fifth step of the process of the present invention.

As illustrated in FIG. 5, the final step in the process of this embodiment of the present invention is the removal of the remaining mask film 14 to form the delineated pattern in film coating 10. Mask film 14 can be removed by standard etching techniques. For example, copper can be removed by using ferric chloride.

Figure 6:
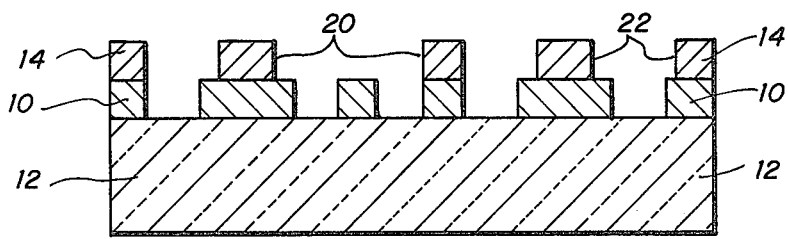
FIG. 6 is a cross-sectional view of a substrate illustrating an alternative fifth step of the process of the present invention.

As an alternative step to removing entire mask film 14, selective portions of mask film 14 can be etched, using standard procedures well known in the art, as illustrated in FIG. 6. This step forms usable electrical components in mask film 14. In this embodiment, the mask forms an integral portion of the end semiconductor device and may include resistors, capacitors and inductors, such as at 20 and terminals such as at 22 for the bonding of discrete components.

It can therefore be seen that the process of the present invention for delineating a patterned electroconductive coating on a substrate is simple to perform, rapid to complete and results in a more versatile end product. The process has been demonstrated to yield lines and spaces with tolerances of ±0.0002 inches and a degree of resolution which has been heretofore not possible with prior patterned delineating processes. In delineating 10 mil lines, for example, tolerances of ±0.2 mils are consistently attainable. Moreover, the method according to the present invention can be used even when the thickness of film coating 10 is in excess of 50 microinches. The aforesaid resolution can be achieved even when the thickness of film coating 10 is at least about 250 microinches. Further, such tolerances are attainable according to the method of the present invention on either planar or non-planar (curved) surfaces.

While specific embodiments of the present invention are shown and described herein, it will be evident to those skilled in the art that numerous modifications and alterations may be made thereto without departing from the spirit and scope of the invention as set forth in the appended claims.

What is claimed is:

1. A process for delineating a film pattern in an air abrasive electroconductive film coating material on a substantially nonconductive substrate comprising:
    forming a substantially continuous film coating of antimony doped tin oxide on the substrate, said film coating having a thickness between about 50 microinches and about 250 microinches;
    integrally applying to said film coating a mask film of metallic material which is air abrasive resistant relative to the antimony doped tin oxide;
    selectively etching said mask film to generate a mask to form masked and unmasked portions on said film coating corresponding to the desired pattern; and
    air abrading said film coating thereby leaving the masked portions of said film coating remaining on the substrate and removing the unmasked portions of said film coating.

2. The process as recited in claim 1 further comprising removing said mask from said film coating resulting in the desired pattern delineated in said film coating on the substrate.

3. A process for delineating a pattern in an air abrasive electroconductive film coating material on a substantially nonconductive substrate comprising:

forming a substantially continuous film coating of antimony doped tin oxide on the substrate, said film coating having a thickness between about 50 microinches and about 250 microinches;

integrally applying to said film coating a mask film of metallic material which is air abrasive resistant relative to said antimony doped tin oxide;

selectively etching said mask film to generate a mask to form mask and unmasked portions on said film coating corresponding to the desired pattern; and air abrading the film coating with air abrading particles having a particle size of from about 10 microns to about 25 microns, said particles being propelled by an air pressure source of approximately 50 psi gauge, thereby leaving the masked portions of said film remaining on the substrate and removing the unmasked portions of said film.

4. A process for delineating a pattern in an air abrasive electroconductive film coating material on a substantially nonconductive substrate comprising:

forming a substantially continuous film coating of antimony doped tin oxide on the substrate;

integrally applying to said film coating a mask film of metallic material which is air abrasive resistant relative to said antimony doped tin oxide;

selectively etching said mask film to generate a mask to form masked and unmasked portions on said film coating corresponding to the desired pattern;

air abrading the film coating, thereby leaving the masked portions of said film coating remaining on the substrate and removing the unmasked portions of said film; and selectively removing said mask from said film coating to form areas of conduction within said mask on said film coating.

5. The process as recited in claim 4 wherein said mask is selectively removed from said film coating by chemical etching.

* * * * *